(12) United States Patent
Taylor

(10) Patent No.: US 9,710,876 B2
(45) Date of Patent: Jul. 18, 2017

(54) GRAPH-BASED APPLICATION PROGRAMMING INTERFACE ARCHITECTURES WITH EQUIVALENCY CLASSES FOR ENHANCED IMAGE PROCESSING PARALLELISM

(71) Applicant: Intel Corporation, Santa Clara, CA (US)

(72) Inventor: Stewart N. Taylor, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 14/664,743

(22) Filed: Mar. 20, 2015

(65) Prior Publication Data

US 2016/0210721 A1    Jul. 21, 2016

Related U.S. Application Data

(60) Provisional application No. 62/104,226, filed on Jan. 16, 2015.

(51) Int. Cl.
*G06T 1/20* (2006.01)

(52) U.S. Cl.
CPC .............. *G06T 1/20* (2013.01); *G06T 2200/28* (2013.01)

(58) Field of Classification Search
CPC ................................ G06T 1/20; G06T 2200/28
See application file for complete search history.

(56) References Cited

U.S. PATENT DOCUMENTS

| | | | |
|---|---|---|---|
| 5,808,625 A | 9/1998 | Picott | |
| 6,762,764 B2 | 7/2004 | Hiwada | |
| 8,250,556 B1 | 8/2012 | Lee et al. | |
| 8,527,972 B2 | 9/2013 | Shimura | |
| 8,549,529 B1 | 10/2013 | Schildan | |
| 2005/0235287 A1* | 10/2005 | Harper .................. G06T 1/20 718/100 |
| 2007/0078846 A1 | 4/2007 | Gulli et al. | |
| 2008/0049022 A1 | 2/2008 | Sherb et al. | |
| 2008/0117216 A1 | 5/2008 | Dorie | |
| 2011/0078500 A1 | 3/2011 | Douros et al. | |
| 2013/0103734 A1 | 4/2013 | Boldyrev et al. | |
| 2014/0359563 A1 | 12/2014 | Xie et al. | |

(Continued)

OTHER PUBLICATIONS

International Search Report and Written Opinion for International Application No. PCT/US2015/064094, mailed on Mar. 21, 2016.

(Continued)

*Primary Examiner* — Amandeep Saini
(74) *Attorney, Agent, or Firm* — Green, Howard & Mughal, LLP

(57) ABSTRACT

A flexible representation of library function equivalency is included in an image graph implementation API to provide a mechanism for a graph node developer to identify functions that may be executed on heterogeneous devices to arrive at sufficiently equivalent results. An image graph executor may employ an equivalency class object or function defined through the image graph implementation API to schedule work subtasks to heterogeneous hardware resources in parallel for greater implementation efficiency.

22 Claims, 12 Drawing Sheets

(56) References Cited

U.S. PATENT DOCUMENTS

2015/0046678 A1 2/2015 Moloney et al.
2015/0379671 A1 12/2015 Brothers et al.

OTHER PUBLICATIONS

The OpenVX Specificaition, Copyright 2011-2014; downloaded on Mar. 16, 2015. Found at: https://www.khronos.org/registry/vx/specs/1.0/html/ (4 pages).

Eruhimov et al., "Realtime traffic sign recognition on mobile processors", Itseez, GTC 2013. Found at: http://on-demand.gputechconf.com/gtc/2013/presentations/S3548-RT-Traffic-Sign-Recognition.pdf, (16 pages).

Gautam et al., "The OpenVX™ [Provisional] Specification", Khronos Group, Version 1.0, Document Revision: r23564, Generated on Thu Oct. 17, 2013. Found at: http://www.slideshare.net/Khronos_Group/open-vx-provisional-specification-1010r23564oct17 (304 pages).

Rainey et al., "Addressing System-Level Optimization with OpenVX Graphs", 2014 IEEE Conference on Computer Vision and Pattern Recognition Workshops (CVPRW). Found at: http://perceptonic.com/goksel/OpenVX/OpenVX_IEEE_EVW_2014.pdf (6 pages).

Trevett, "Open Standard APIs for Embedded Vision Processing", Khronos Group 2014. Found t: https://www.khronos.org/assets/uploads/developers/library/2014-gdc/Khronos-OpenVX-GDC-Mar14.pdf (28 pages).

Trevett, "APIs for Vision Acceleration, Camera Control and Sensor Fusion", Khronos Group, 2013. Found at: http://www.slideshare.net/Khronos_Group/openvx-overview (24 pages).

Kramer, R. et al., "The Combining DAG: A Technique for Parallel Data Flow Analysis", IEEE Transactions on Parallel and Distributed Systems, Aug. 1994, vol. 5, No. 8, pp. 805-813.

Yamauchi, Tsukasa et al., "SOP: A Reconfigurable Massively Parallel System and Its Control-Data-Flow based Compiling Method", NEC Laboratory, IEEE 1996, pp. 148-156.

Non-Final Office Action mailed Mar. 30, 17 for U.S. Appl. No. 14/664,736.

Notice of Allowance mailed Feb. 27, 2017 for U.S. Appl. No. 14/6445,725.

* cited by examiner

GRAPH-BASED APPLICATION PROGRAMMING INTERFACE ARCHITECTURES WITH EQUIVALENCY CLASSES FOR ENHANCED IMAGE PROCESSING PARALLELISM

CROSS REFERENCE TO RELATED APPLICATIONS

This application claims the benefit under 35 U.S.C. Sec. 119(e) of U.S. provisional application 62/104,226 titled "Graph-based Application Programming Interface Architectures and Optimization Engines For Enhanced Image Processing Parallelism," filed Jan. 16, 2015.

BACKGROUND

Computer vision processing (e.g., face/body/gesture tracking, object and scene detection/reconstruction, automated visual inspection, etc.) is becoming an increasingly important capability of computing device platforms. Accelerated visual processing optimized for performance and/or power is particularly important for real time, mobile, and/or embedded device applications. Increasingly powerful processors and image sensors are enabling computing platforms with greater visual intelligence. However, distributing complex vision processing algorithms across device platform processors best suited to the application remains a difficult problem.

A typical image processing application performs several successive operations on images with the output of one operation used as the input of another operation (e.g., pipeline stages). A graph-based image processing implementation optimization API provides a useful level of abstraction for vision processing execution and memory models, and provides a formal description of an operation sequence as a directed acyclic graph (DAG). The DAG is a collection of nodes that describe the image processing tasks by means of connections between them. Nodes of a graph correspond to source and destination data (e.g., images) or to operations on images. Edges of a graph define data flow in a task. A connection between nodes means that the result of one operation ("output") is used as the input for another operation. Each node may be associated with one or more hardware resource where the node is to be executed.

The OpenVX 1.0 specification released October 2014 by the Khronos Group, is one example of a graph-based image processing implementation optimization API providing a framework for managing and executing graphs. With such an API, an application developer may define image processing tasks by building a graph of the image processing functions and rely on the API framework for implementation over a wide array of platforms. An implementer provides a graph compiler and graph executor that is compatible with the graph-based implementation API and is configured to most efficiently execute image processing tasks for a given implementation by passing image data through the graph nodes.

It is advantageous for a graph-based image processing implementation API to provide implementers with the information needed to make task/work assignments and scheduling decisions that may, for example, improve efficiency through parallelism.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION OF EXEMPLARY EMBODIMENTS

Figure 1A:
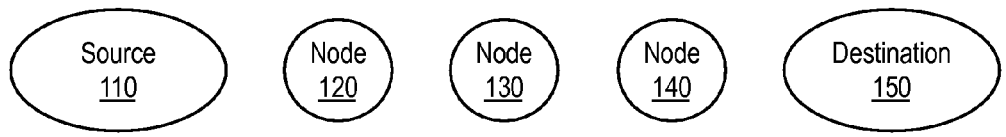
FIG. 1A illustrates nodes to be included in an image processing graph, in accordance with some embodiments.

One or more embodiments are described with reference to the enclosed figures. While specific configurations and arrangements are depicted and discussed in detail, it should be understood that this is done for illustrative purposes only. Persons skilled in the relevant art will recognize that other configurations and arrangements are possible without departing from the spirit and scope of the description. It will be apparent to those skilled in the relevant art that techniques and/or arrangements described herein may be employed in a variety of other systems and applications beyond what is described in detail herein.

Reference is made in the following detailed description to the accompanying drawings, which form a part hereof and illustrate exemplary embodiments. Further, it is to be understood that other embodiments may be utilized and structural and/or logical changes may be made without departing from the scope of claimed subject matter. Therefore, the following detailed description is not to be taken in a limiting sense and the scope of claimed subject matter is defined solely by the appended claims and their equivalents.

In the following description, numerous details are set forth, however, it will be apparent to one skilled in the art, that embodiments may be practiced without these specific details. Well-known methods and devices are shown in block diagram form, rather than in detail, to avoid obscuring more significant aspects. References throughout this specification to "an embodiment" or "one embodiment" mean that a particular feature, structure, function, or characteristic described in connection with the embodiment is included in at least one embodiment. Thus, the appearances of the phrase "in an embodiment" or "in one embodiment" in various places throughout this specification are not necessarily referring to the same embodiment. Furthermore, the particular features, structures, functions, or characteristics described in the context of an embodiment may be combined in any suitable manner in one or more embodiments. For example, a first embodiment may be combined with a second embodiment anywhere the particular features, structures, functions, or characteristics associated with the two embodiments are not mutually exclusive.

As used in the description of the exemplary embodiments and in the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

As used throughout the description, and in the claims, a list of items joined by the term "at least one of" or "one or more of" can mean any combination of the listed terms. For example, the phrase "at least one of A, B or C" can mean A; B; C; A and B; A and C; B and C; or A, B and C.

The terms "coupled" and "connected," along with their derivatives, may be used herein to describe functional or structural relationships between components. It should be understood that these terms are not intended as synonyms for each other. Rather, in particular embodiments, "connected" may be used to indicate that two or more elements are in direct physical, optical, or electrical contact with each other. "Coupled" may be used to indicated that two or more elements are in either direct or indirect (with other intervening elements between them) physical, optical, or electrical contact with each other, and/or that the two or more elements co-operate or interact with each other (e.g., as in a cause an effect relationship).

Some portions of the detailed descriptions provide herein are presented in terms of algorithms and symbolic representations of operations on data bits within a computer memory. Unless specifically stated otherwise, as apparent from the following discussion, it is appreciated that throughout the description, discussions utilizing terms such as "calculating," "computing," "determining" "estimating" "storing" "collecting" "displaying," "receiving," "consolidating," "generating," "updating," or the like, refer to the action and processes of a computer system, or similar electronic computing device, that manipulates and transforms data represented as physical (electronic) quantities within the computer system's circuitry including registers and memories into other data similarly represented as physical quantities within the computer system memories or registers or other such information storage, transmission or display devices.

While the following description sets forth embodiments that may be manifested in architectures, such system-on-a-chip (SoC) architectures for example, implementation of the techniques and/or arrangements described herein are not restricted to particular architectures and/or computing systems, and may be implemented by any architecture and/or computing system for similar purposes. Various architectures employing, for example, multiple integrated circuit (IC) chips and/or packages, and/or various computing devices and/or consumer electronic (CE) devices such as set-top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. Furthermore, some material such as, for example, control structures and full software instruction sequences, may not be shown in detail in order not to obscure the material disclosed herein.

Certain portions of the material disclosed herein may be implemented in hardware, for example as logic circuitry in a central processor core. Certain other portions may be implemented in hardware, firmware, software, or any combination thereof. At least some of the material disclosed herein may also be implemented as instructions stored on a machine-readable medium, which may be read and executed by one or more programmable processors (graphics processors and/or central processors). A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical, or other similarly non-transitory, tangible media.

One or more system, apparatus, method, and computer readable media is described below for extracting parallelism in an image graph processing. Techniques and architectures described below for exemplary image processing embodiments can be applied to many other data blocks generalized to technologies such as, but not limited to, signal processing and audio/video coding.

In some embodiments, an engine for executing a set or series of imaging operations is expressed by an image processing software developer as a graph or series of function calls. A graph is a class of objects that contain all information to organize calculations among nodes in the graph. A graph class interface of a graph API enables adding nodes to a graph and connecting their input and output ports. Nodes of an image processing graph correspond to source and destination data and operations to be performed on images (image data blocks). FIG. 1A illustrates a set operations with each operation contained in a compute node (e.g., node 120, node 130, node 140) or source/destination node. Source node 110 and destination node 150 are each a data array or data stream entered into the graph explicitly.

Each operation of a compute node may be selected, for example, from a library of many hundreds/thousands of functions. Any low level compute library or API (e.g., an OpenCL compliant library) may be enlisted within each node. In some embodiments, the compute note functions are designed for whole image processing. The image graph implementation API provides function(s) for creating/adding nodes, for example:

```
// Create Nodes
    SrcNode::Params src1Params( );
Node *in1=nfIA.CreateNode(SrcNode::NodeUniqueName( ),
&src1Params);
    ...
SimpleNode_2_1::Params simple1Params(idmAdd);
Node *add=nfIA CreateNode(SimpleNode_2_1::NodeUniqueName( ),
&simple1Params);
```

Figure 1B:
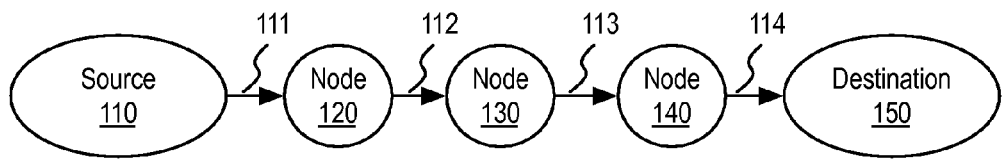
FIG. 1B illustrates connecting nodes into an image processing graph, in accordance with some embodiments.

Node objects contain information about node connectivity (number of input and output ports) and the main parameters for the function associated with the node. Objects of derivative classes can contain other parameters, depending on the node function. FIG. 1B illustrates a connection of nodes to create image processing tasks. The graph edges 111, 112, 113, 114 are provided by the image processing software developer to define the flow of the data array/data stream from source node 110 through the compute nodes 120, 130, 140, to destination node 150. The graph-based implementation API provides function(s) for connecting an image graph, for example:

```
            // Connect Graph
            g->Link(in1Id,0, addId,0);
```

Numbers of objects and ports are used by the Link method to connect the output port of one object with the input port of another object.

Figure 1C:
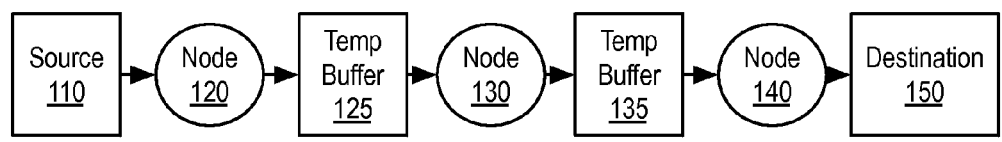
FIG. 1C illustrates execution of an image processing graph, in accordance with some embodiments.

In some embodiments, the image graph is then transformed, or compiled, by a graph compiler into a sequence of image processing function calls that are applied to data blocks or small parts of the input image data referred to herein as a tiles. Tiles include slices having the whole width of an image, as well as rectangles of arbitrary dimension and orientation within an image. A compile member function of a class compiles the graph object. During compile, the graph is verified for absence of cycles, absence of isolated nodes, correspondence of data types and number of channels between nodes. In embodiments, the compile function is further responsible for determining an optimal tile size according to an available cache size. During image graph execution, the passage of a data block through compute nodes between source node 110 and destination node 150 constitutes a series of image processing tasks. As illustrated in FIG. 1C, execution of the image graph may be conceptualized with temporary buffers 125, 135 inserted between compute nodes 120, 130 and 130, 140, respectively used for retaining the results of each task.

Figure 2A:
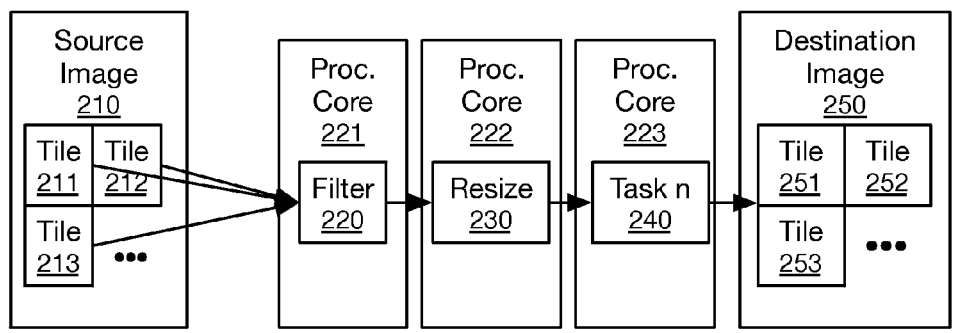
FIG. 2A illustrates graph-based optimization through task-based decomposition, in accordance with some embodiments.

In some embodiments, a graph optimization engine performs a graph-based optimization entailing a task-based decomposition. For task-based decomposition, the output of one operation (e.g., in node 120) used as the input of another operation (e.g., in node 130). An example of a graph-based optimization through task-based decomposition is illustrated in FIG. 2A, where separate processor cores or compute units are assigned different tasks. For example, a processor core 221 is responsible for a filter 220, processor core 222 is responsible for a resize 230, and processor core 222 is responsible for an $n^{th}$ task. Many image processing applications utilize very large images (e.g., several megapixels), and the total memory used for image processing may exceed the size of a local buffer (e.g., a second-level cache of a processor). In these conditions the bottleneck becomes memory access, so source image 210 is decomposed into data blocks associated with sections of source image 210. These image fragments (e.g., source tiles 211, 212, 213) are then processed by processor cores 221, 222, 223 to generate destination tiles 251, 252, 253 of destination image 250.

Figure 2B:
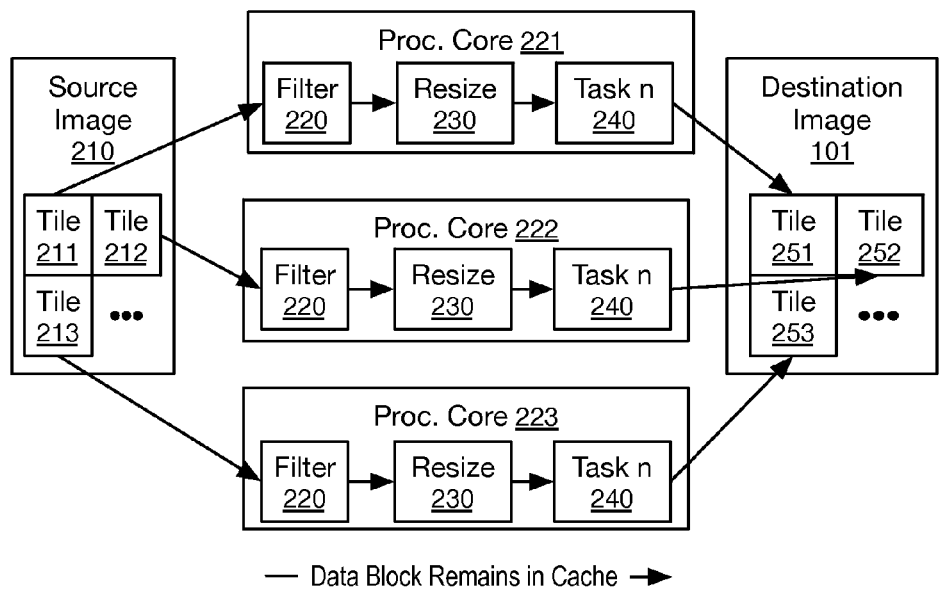
FIG. 2B illustrates graph-based optimization through spatial decomposition, in accordance with some embodiments.

In some embodiments, a graph optimization engine performs a graph-based optimization entailing a tile-based, or spatial, decomposition. As illustrated in FIG. 2B, each processor core 221, 222, 222 is responsible for performing the filter 220, resize 230, and the $n^{th}$ task 240 for one source tile 211, 212, 213, respectively. As an example, one efficiency possible with tile-based decomposition is the retention of a data block (e.g., corresponding to one tile) within a local memory buffer (e.g., a level-two cache associated with a processor core) as successive tasks are performed on the data block.

Figure 2C:
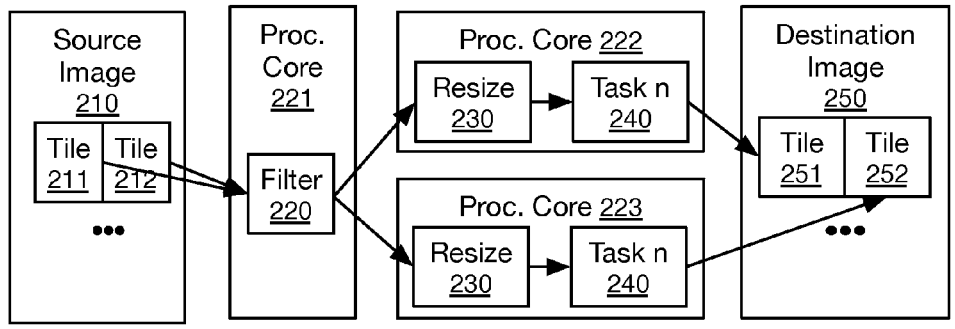
FIG. 2C illustrates a graph-based optimization entailing both spatial and task decomposition.

In some embodiments, a graph optimization engine performs a graph-based optimization entailing both spatial and task decomposition. As depicted in FIG. 2C, processor core 221 is responsible for filter 220, which may be computationally expensive relative to resize 230 and $n^{th}$ task 240. Processor cores 222 and 223 may be assigned the resize 230 and $n^{th}$ task 240 to output a separate destination tile 251, 252 from one source tile 211, 212. Processor core 221 processes both source tiles 211, 212 to complete filter task 220.

Figure 2D:
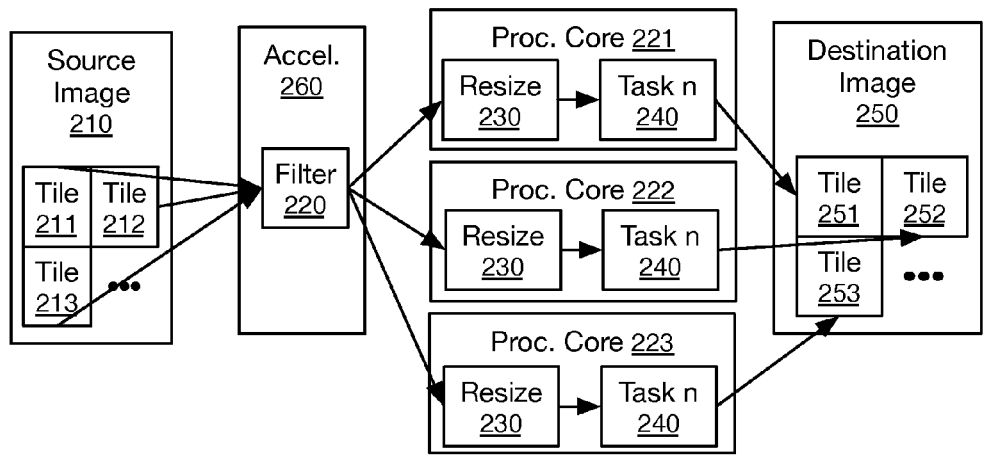
FIG. 2D illustrates both spatial and task decomposition over heterogeneous hardware resources, in accordance with some embodiments.

In some embodiments, a graph optimization engine performs a graph-based optimization entailing either or both spatial and task decomposition over heterogeneous hardware resources. FIG. 2D illustrates both spatial and task decomposition over heterogeneous hardware resources including a hardware accelerator 260 in addition to multiple cores of a processor. In the depicted example, accelerator 260 handles filter task 220 for all source tiles 211, 212, and 213. One processor core 221, 222, 223 is responsible for performing both resize task 230 and $n^{th}$ task 240 on a filtered data block corresponding to one source tile 211, 212, 213, respectively.

Explicitly splitting a source image into fragments and performing the required operation on these fragments is particularly difficult if an operation requires data outside an image fragment, or the processing operations require a change in the fragment size. Furthermore, in the above embodiments, parallelization of the calculation sequence may be advantageous. For example, the processing of one image fragment, then another, need not be scheduled such that all fragments are processed through a first task by one hardware resource before any fragment is processed through another task by another hardware resource. Greater processing efficiency may be had where processing of a fragment through one task is instead predicated only on that fragment having been first processed through a preceding task, regardless of the status of any other fragment processing.

In some embodiments, a heterogeneous array of processing elements is employed to execute various subtasks of a node. Whereas a task entails passing a source image through a node operation (e.g., resizing an image), a first subtask entails passing a first portion of a source image (i.e., a first data block) through the node operation, while a second subtask entails passing a second portion of the source image (e.g., a second data block) through the node operation.

In the heterogeneous embodiment illustrated in FIG. 2D, a first portion of a processing pipeline (e.g., a filter 220) is executed on one device or hardware resource (e.g., hardware accelerator 260) having a first instruction set architecture (ISA) while a second portion (e.g., resize 230) is executed on another device or hardware resource (e.g., processor core 221) having a second ISA. Distributing the various subtasks associated with passing one tile (e.g., 211, 212, or 213) through a resize node to multiple cores 221, 222, and 223 is an optimization that a graph executor/execution engine may readily implement where the resize operation, as defined in an implementation library for a multi-core processor, has bit equivalency across cores 221, 222, 223. However, the threshold of bit-equivalency may be unnecessarily restrictive for a graph node. For situations having device heterogeneity at the subtask level, a graph developer may leverage greater efficiencies through enhanced parallelism extraction.

Figure 3A:
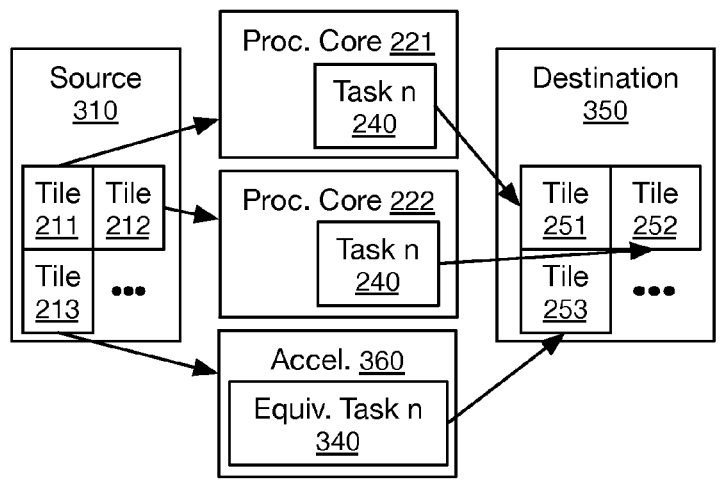
FIG. 3A is a functional block diagram illustrating subtask decomposition over heterogeneous hardware resources, in accordance with some embodiments.

FIG. 3A illustrates subtask decomposition over heterogeneous hardware resources including a hardware accelerator 260 in addition to multiple cores 221, 222 of a central processor. In the depicted example, each processor core 221, 222 is responsible for performing a subtask comprising passing a data block associated with one source tile 211, 212 through $n^{th}$ task 240. Accelerator 360 handles an equivalent subtask where source tile 213 is passed equivalent $n^{th}$ task 340. In embodiments where the nth task 240 and equivalent nth task 340 are not bit-equivalent operations of the same name, the subtask decomposition over heterogeneous hardware resources illustrated in FIG. 3A is facilitated through a node-level specification referred to herein as an "equivalency class." The equivalency class object or function specifies for a given node an association between equivalent library functions and/or equivalent functions from different libraries correspondingly executable on heterogeneous resources. The equivalency class provides a mechanism for a node or graph developer to specify equivalency where the concept of equivalency is left entirely up to the developer. As such, functions may be deemed equivalent in the context of one node in a graph, but not another. Furthermore, functions defined to be equivalent by the user for a given node need not even employ remotely similar algorithms or functional intent.

Figure 3B:
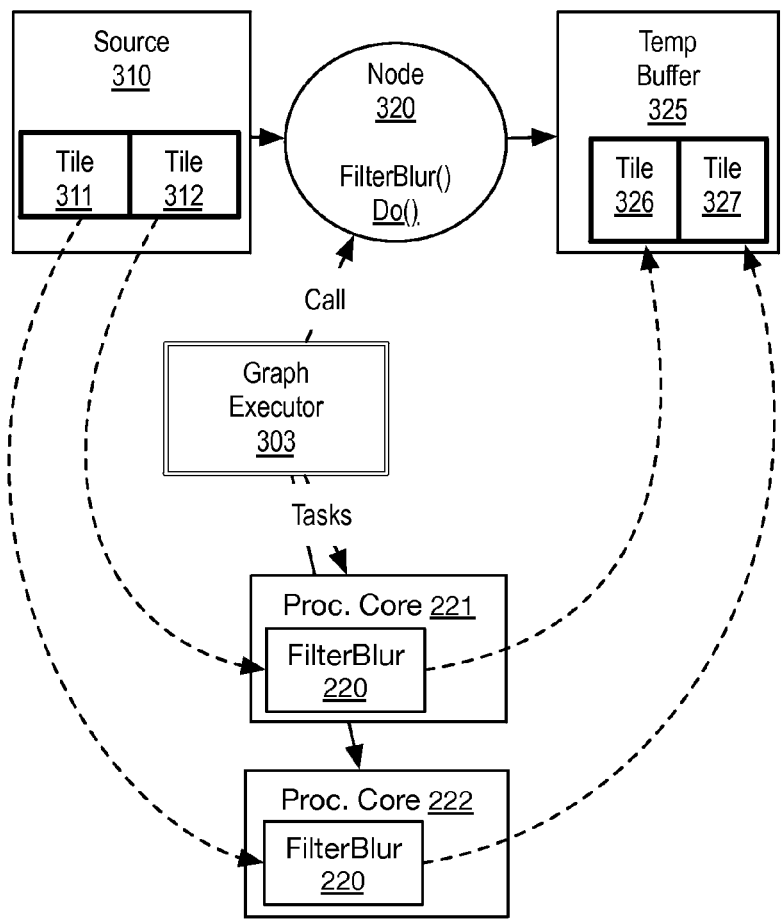
FIG. 3B is a function block diagram illustrating subtask decomposition constrained to maintain bit-equivalency.

In some embodiments, a graph-based image processing implementation API provides a framework for defining an equivalency class node. The implementation API may provide a set of member functions for an image graph developer to associate a lower-level (image processing) library function with a particular graph node. For example, as illustrated in FIG. 3B, node 320 is associated with a lower level library function "FilterBlur( )". The node member function Do( ) is called to apply the specified FilterBlur( ) function to the node's input data (e.g., a first data block) and store the result in the node's output. In some embodiments, node-level member functions include a mapping function to designate equivalency between two or more lower level (image processing) library functions of different names and/or lacking bit equivalence. Absent such an equivalency class designation, a graph executor is to process a data block through a compiled graph node by calling the library function with the task executing on a first hardware resource, or a set of hardware resources for which the lower level library function has bit-equivalency. If more than one hardware resource is to be employed to perform FilterBlur, absent an equivalency class mapping, the executor is constrained to maintain bit-equivalency between the subtasks of node 320. For example, as illustrated in FIG. 3B, graph executor processes tiles 312, 311 through node 320 by executing library function FilterBlur subtasks 220 on processor cores 221, 222, respectively.

Figure 3C:
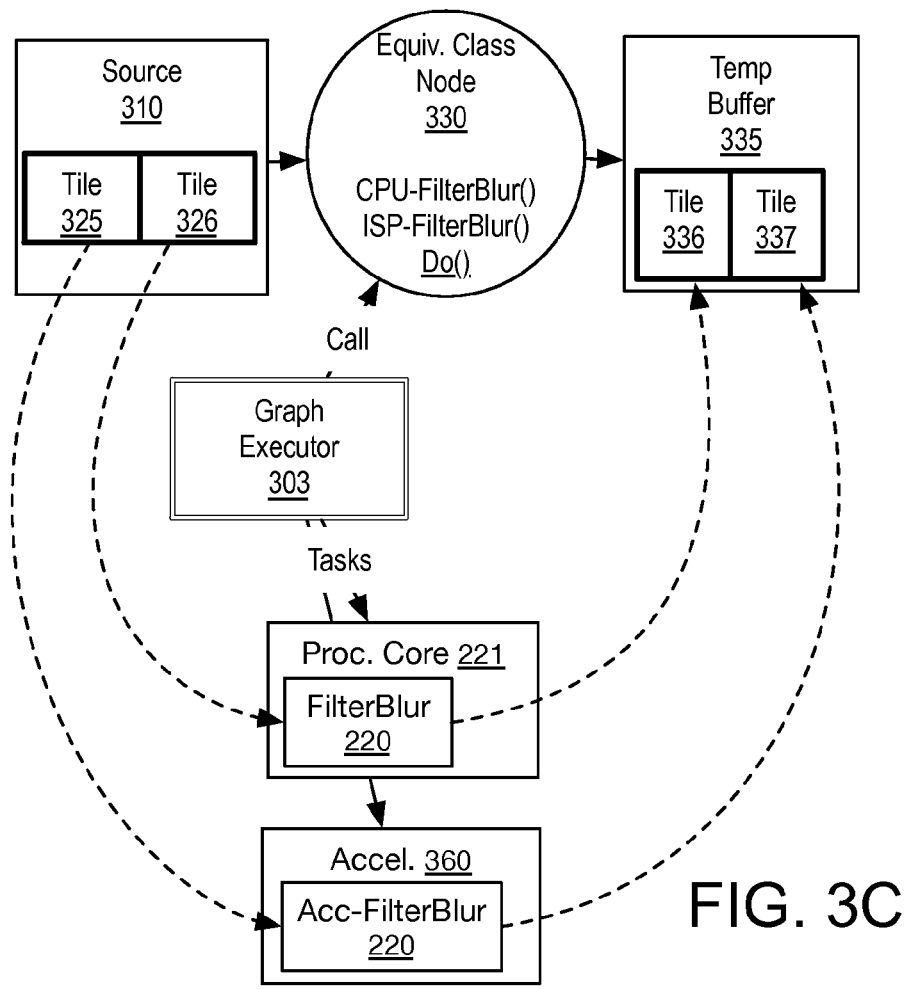
FIG. 3C is a functional block diagram illustrating subtask decomposition over heterogeneous hardware resources based on an equivalency class node, in accordance with some embodiments.

In contrast, where a node includes an equivalency class designation, a graph executor is to process a data block through the graph node by calling any equivalent function, regardless of bit-equivalence, that is mapped for the node through the equivalency class definition. In some embodiments, a work distributor executes portions of an operation associated with an equivalency class node in parallel on different, heterogeneous, devices. In FIG. 3C for example, node 330 includes an equivalence class designation associating the FilterBlur library function with the "Acc-FilterBlur" library function. Graph executor processes tiles 312, 311 through node 330 by executing a FilterBlur subtask 221 and a Acc-FilterBlur subtask 222.

Figure 3D:
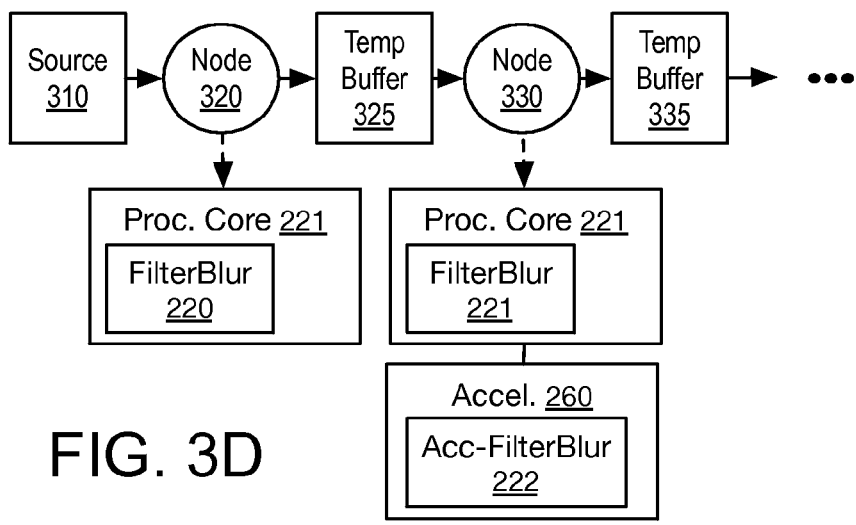
FIG. 3D is a functional block diagram illustrating subtask decomposition based on node-level equivalency definitions, in accordance with some embodiments.

Notably, with equivalency class designation at the node level, the equivalency is determined dynamically as the graph executor processes each node. Equivalency may vary within a graph and/or between different graphs. Equivalency is able to be context dependent in the sense two functions may be defined as equivalent for one node but not another. In other words, a given library function may lack equivalency in a first node but have equivalency in a second node within a same graph. For example, where the nodes 320 and 330 from FIGS. 3B and 3C are combined to form the pipeline illustrated in FIG. 3D, library function FilterBlur lacks any node-defined equivalency in a first part of the pipeline (e.g., graph node 320). However, node-defined equivalency exists in a second portion of the pipeline (e.g., graph node 330). With node-level designations, a node and/or graph developer may determine whether two or more image processing operations will provide sufficiently equivalent result for the purposes of each single node in particular processing application. If so, the content of the equivalency class designation for the node frees the graph executor to more widely implement heterogeneous sub-task parallelism.

While the Blur and FilterBlur functions in the example may be intended to produce very similar results, a node may just a readily specify two functions having dissimilar algorithms as "equivalent". As one example, the two dissimilar algorithms may differ in precision, execution time, or even fundamental intent. For example, a number of different filter functions (e.g., AdaptiveFilter( ) function, 7×7Filter( ) function, and SimpleFilter( ) function) may all be deemed equivalent for one equivalence class node. In another example, an edge detection function CannyEdge Detection( ) is specified to be equivalent with a filter function SimpleFilter( ). In some embodiments, a work scheduler is to select between equivalent functions to implement a policy optimizing an image processing pipeline that minimizes processing time to achieved a given quality-of-service QoS (e.g., to achieve a particular frame rate for video). With that goal, a graph developer may define an equivalency class that equates an AdaptiveFilter( ) function with a simplified noise reduction function ImproveQualityLow( ) or even a bypass function DoNothing( ). As such, the equivalency class designation provides a programmatic means to implement conditional parallelism by way of the graph-based implementation API.

Figure 4:
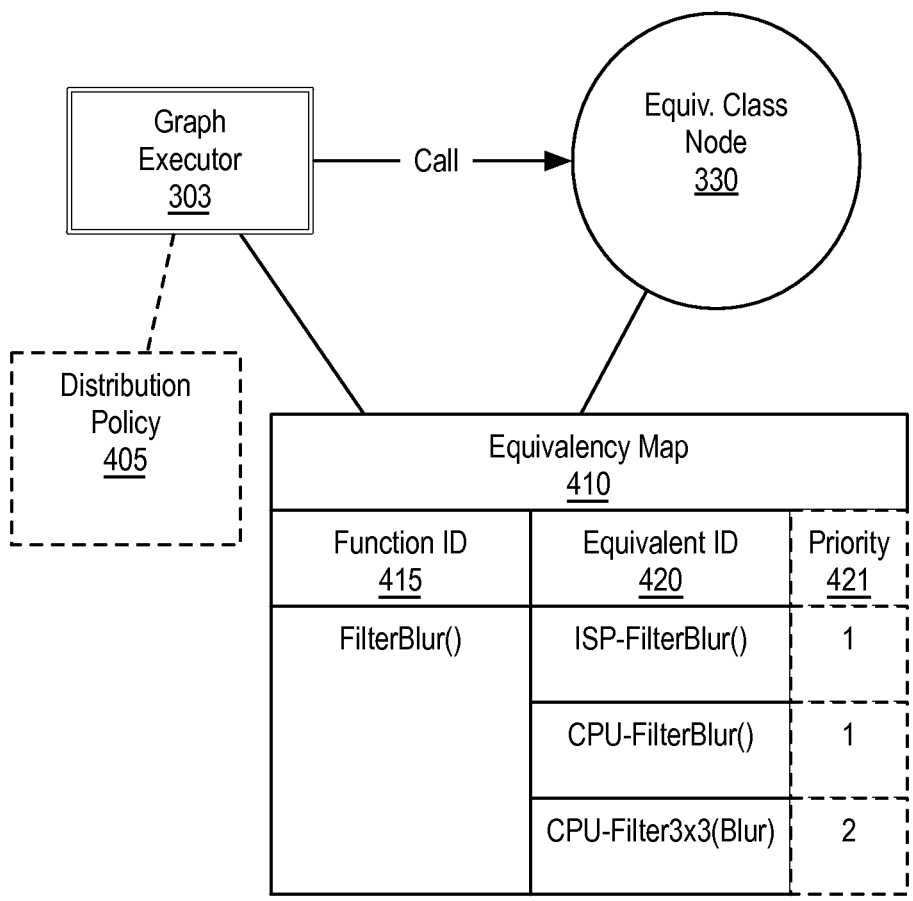
FIG. 4 is a function block diagram illustrating components of a node-defined equivalency logic, in accordance with some embodiments.

In embodiments, an equivalency class node designation includes equivalency mapping. Equivalency mapping may take any form, such as, but not limited to, a table associating a first function with one or more second "equivalent" functions. FIG. 4 illustrates an equivalency map 410 including a function identifier (ID) field 415 and one or more "equivalent" ID field 420. Each entry in equivalent ID filed 420 is mapped to a function ID 415. For example, "ISP-FilterBlur( )" and "CPU-FilterBlur( )" are designated as equivalent to FiterBlur( ). The parameters passed to each are the same. The function "CPU-Filter3×3," when passed the additional parameter "Blur" is also mapped as an equivalent to the function FilterBlur( ). Other data structures may be similarly employed to define an equivalency class node. In some embodiments, an equivalency class node data structure is based on hierarchical class inheritance. For example, an equivalency class node may be defined as a meta-node including two or more child nodes. Each of a plurality of child nodes of the equivalency class node can be associated with an image processing function (e.g., ISP-FilterBlur) that is equivalent with processing functions associated with all other child nodes of the equivalency class node.

In some embodiments, a graph executor schedules a plurality subtasks according to one or more optimization goals expressed in a policy. In the example illustrated in FIG. 4, graph executor 303 is to schedule equivalent subtasks based on a work distribution policy 405. Work distribution policy 405 may be defined at the node level, or defined for a particular image graph implementation API. Work distribution policy 405 may, for example, constrain distribution of work between heterogeneous devices to emphasize goals pertaining to any of: latency, execution time, resource utilization, memory availability, temporal locality, and/or memory bandwidth. In further embodiments, a mapping object associated with the equivalency class node may further specify a priority for each equivalent function. In some embodiments, graph executor is to implement a policy-based selection/distribution of equivalent function calls based, at least in part, on the function priority. For example, the equivalency map 410 may further include a priority field 421 expressing a priority-based bias for ISP-FilterBlur( ) and CPU-FilterBlur( ) over CPU-Filter3×3 (Blur).

In further embodiments, a graph executor is to implement a policy-based selection/distribution of equivalent function calls based, at least in part, on an estimated execution time for each member (equivalent) function of an equivalency class. For example, in some embodiments an equivalent function that has a shorter execution time is selected in preference over an equivalent function having a longer execution time. In other embodiments, a first equivalent function that has an execution time more nearly matching a second equivalent function is selected in preference over a third equivalent function having a longer or shorter execution time. In further embodiments, a graph executor is to implement a policy-based selection/distribution of equivalent function calls based, at least in part, on a maximum time allotted to a given hardware resource slot, or to all slots. For example, in some embodiments, a first equivalent function having a shorter execution time is selected in preference over an equivalent function having an execution time that exceeds a maximum time allocated to hardware resource slot.

Figure 5A:
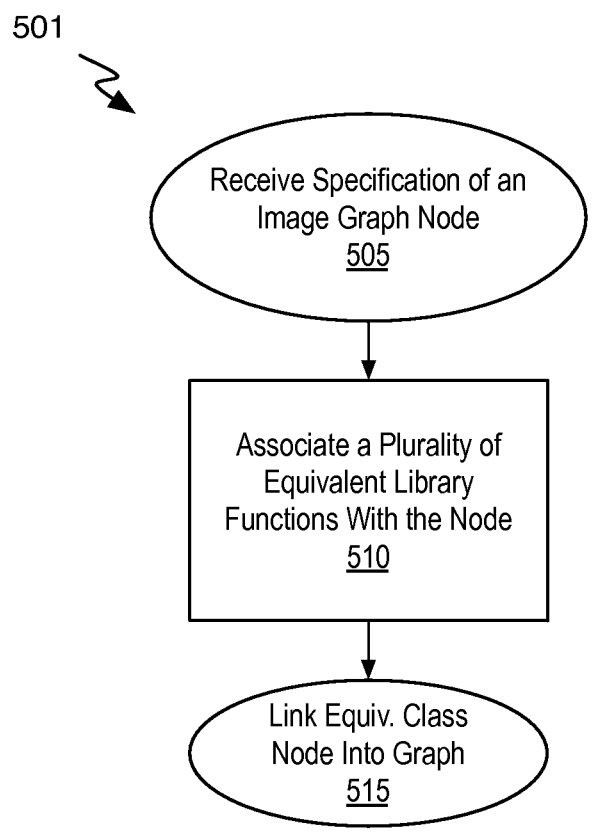
FIG. 5A is a flow diagram illustrating a method for creating an equivalency class node, in accordance with some embodiments.

FIG. 5A illustrates a producer node creation method 501. Method 501 may be performed, for example, by a graph-based image processing implementation optimization API. Method 501 begins with receiving a specification of an image graph node at operation 505 using any known technique. An image processing function is associated with the specified graph node. To enable node-defined equivalency logic of a graph executor, a function equivalency mapping object and/or function is further associated with the node, thereby defining an equivalency class node at operation 510. In some embodiments, the function equivalency mapping object/function is to provide an indication of two or more library functions that may be called to execute tasks associated with the node. In some embodiments, the function equivalency mapping object/function is to return one or more equivalent library function identifiers for a designated library function identifier. The functionalized equivalency class node is then linked to an image graph at operation 520 using any known technique. For example, the equivalency class node may be linked to at least one of a source, destination, producer, or consumer.

Figure 5B:
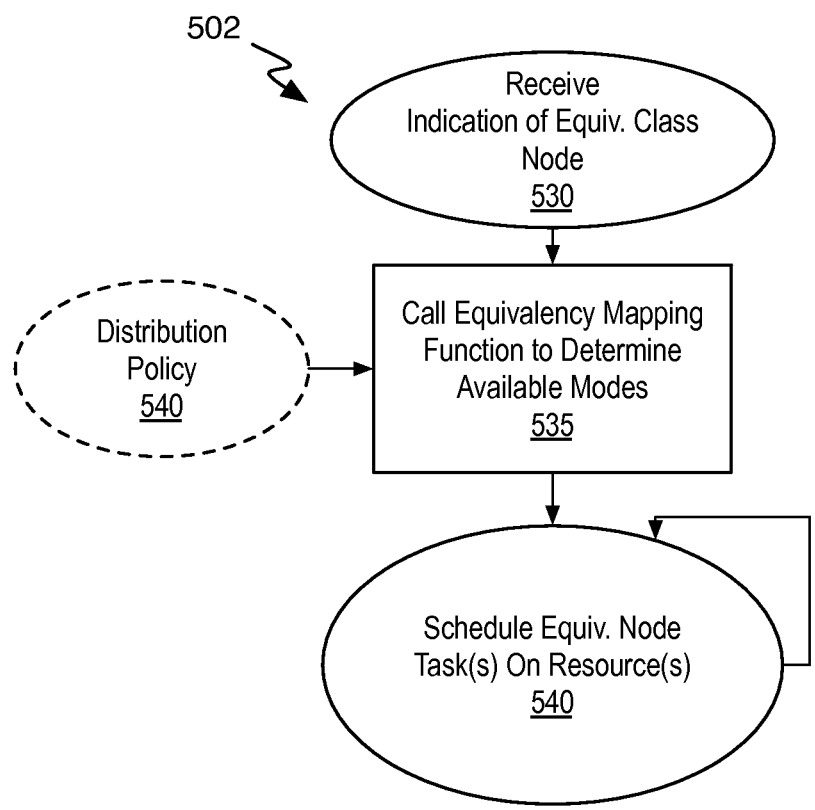
FIG. 5B is a flow diagram illustrating a method for executing an equivalency class node, in accordance with some embodiments.

FIG. 5B illustrates a graph execution method 502, which may be performed, for example by a centralized image graph work scheduler (e.g., graph executor or graph execution engine). At operation 530, the graph executor receives an indication of an equivalency class node, for example through a framework defined in a graph-based implementation optimization API. At operation 535, a call is made to an equivalency mapping object or function to ascertain two or more functions having equivalence with respect to the equivalency node. In some embodiments, a selection between two or more equivalent functions may be made based on a policy (e.g., priority identifier, execution time, etc.). Upon receiving and/or determining the node-defined equivalency information, the graph executor schedules one or more processing task where one or more data block (e.g., tile) is processed by executing an equivalent function on one or more hardware resource. In further embodiments, two or more processing task are scheduled at operation 540. A first task associated with passing a first data block through a first hardware resource is schedule, and a second task associated with passing a second data block through a second hardware resource is also scheduled. Operation 540 may be iterated, for example with each iteration entailing the scheduling or execution of one node subtask for processing one or more additional data block through another hardware resource. In further embodiments, iteration of operation 540 results in a plurality of subtasks being scheduled for parallel execution by heterogeneous devices executing functions identified by the equivalency class mapping object/function.

Figure 6:
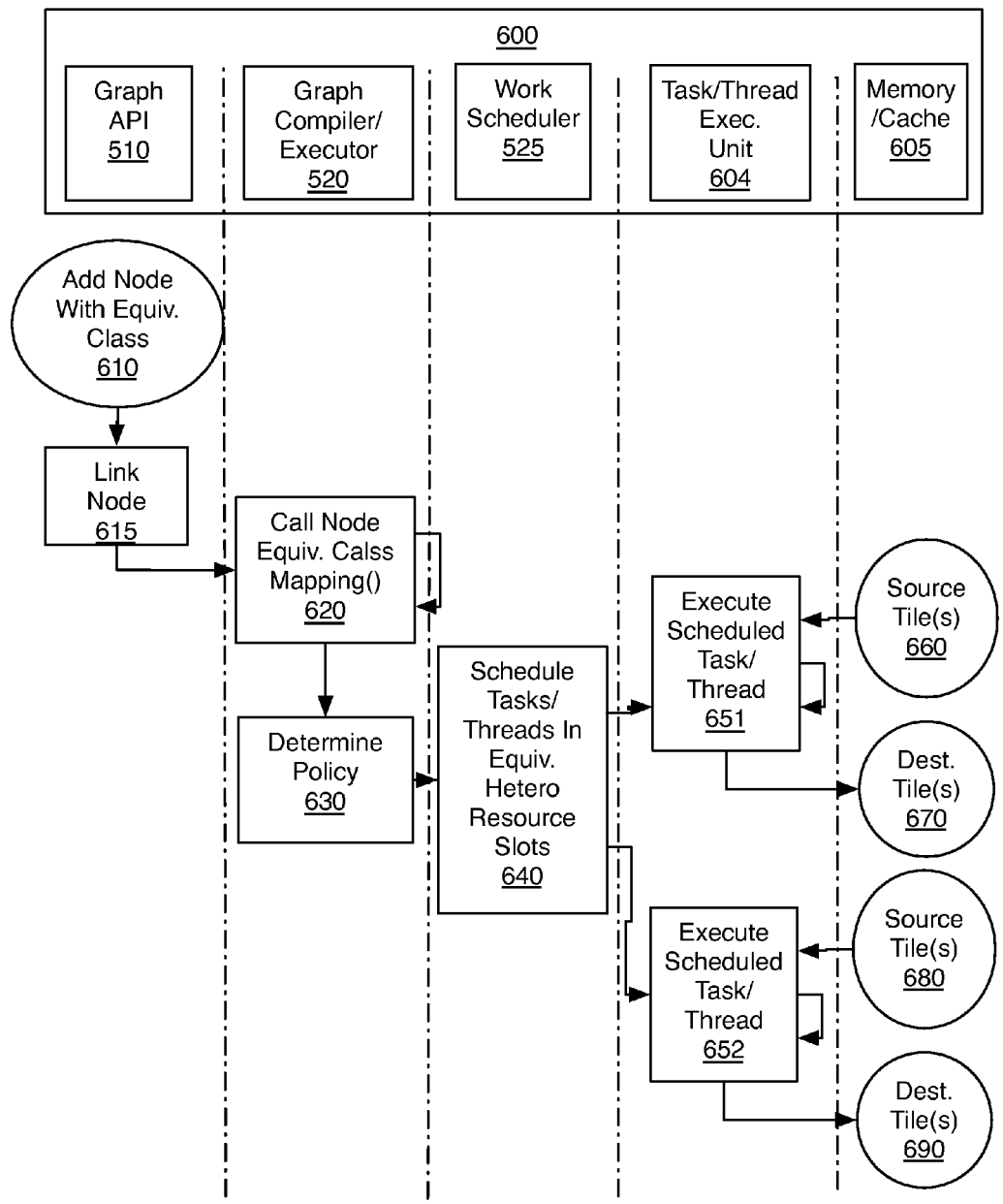
FIG. 6 is a functional block diagram illustrating an image processing pipeline implementation including equivalency graph node graph optimizations, in accordance with embodiments.

FIG. 6 is a functional block diagram illustrating an image processing pipeline implementation 600 including node-defined equivalency class graph optimizations. Not all depicted operations need be performed by a single implementation or contemporaneously. For example, equivalency node creation operations 610, 615 may be performed during image pipeline develop time in advance of graph compile and/or execution operations 620, 630 performed during image pipeline runtime. In FIG. 6, vertical dash lines demark the functional element(s) enlisted in performance of the operations depicted within those lines. API 510 is employed to add and link graph nodes having equivalency class mapping functionality at operations 610, 615. At operation 620, graph executor 520 issues calls to a node equivalency mapping function and determines library function equivalency information. Work scheduler 525 schedules tasks/threads based on node-defined equivalency information at operation 640. Task/thread execution unit 604 of a first resource (e.g., a CPU core, GPU EU, IPU VU, etc.) executes scheduled first subtasks/threads at operation 651, reading source tiles 660 from an electronic memory and/or cache 605, and writing destination tiles 670 to memory and/or cache 605. Task/thread execution unit 604 of a second, heterogeneous resource (e.g., a CPU core, GPU EU, IPU VU, etc.) executes scheduled second subtasks/threads at operation 652, reading source tiles 680 from an electronic memory and/or cache 605, and writing destination tiles 690 to memory and/or cache 605.

Figure 7:
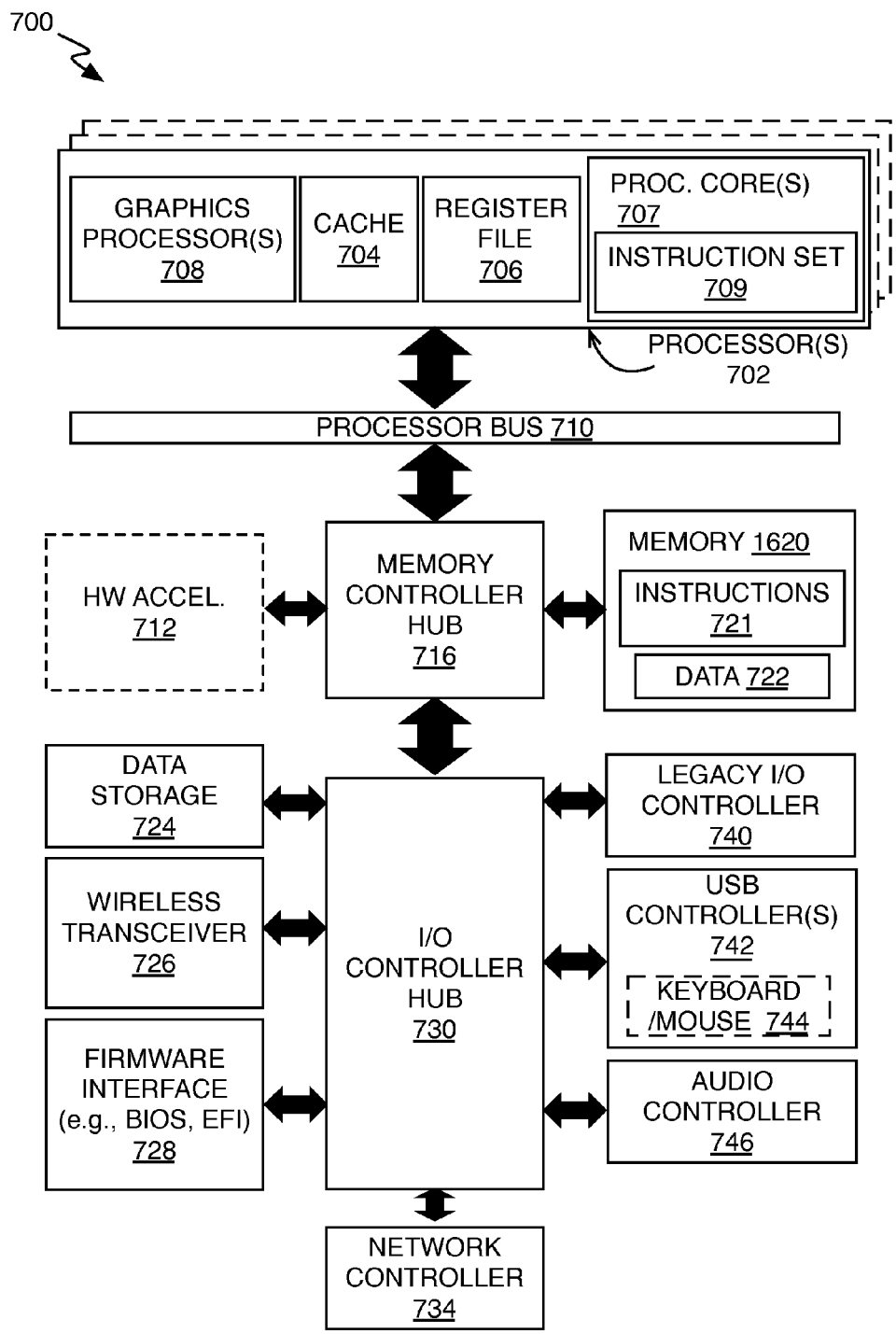
FIG. 7 is a functional block diagram of a data processing system, in accordance with some embodiments.

FIG. 7 is a functional block diagram of a data processing system 700 that may be utilized to perform graph processing with equivalency class nodes in accordance with some embodiments. Data processing system 700 includes one or more processors 702 and one or more graphics processors 708, and may be a single processor mobile device or desktop device, a multiprocessor workstation, or a server system having a large number of processors 702 or processor cores 707. In on embodiment, the data processing system 700 is a system-on-a-chip (SoC) integrated circuit for use in mobile, handheld, or embedded devices.

An embodiment of data processing system 700 can include, or be incorporated within a server-based gaming platform, a game console, including a game and media console, a mobile gaming console, a handheld game console, or an online game console. In some embodiments, data processing system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, processor 702 is coupled to a processor bus 710 to transmit data signals between processor 702 and other components in system 700. System 700 has a 'hub' system architecture, including a memory controller hub 1616 and an input output (I/O) controller hub 730. Memory controller hub 716 facilitates communication between a memory device and other components of system 700, while I/O Controller Hub (ICH) 730 provides connections to I/O devices via a local I/O bus.

Memory device 720 can be a dynamic random access memory (DRAM) device, a static random access memory (SRAM) device, flash memory device, or some other memory device having suitable performance to serve as process memory. Memory 720 can store data 722 and instructions 721 for use when processor 702 executes a process. Memory controller hub 716 also couples with an optional external hardware accelerator 712, which may communicate with the one or more graphics processors 708 in processors 702 to perform graphics and media operations.

In some embodiments, ICH 730 enables peripherals to connect to memory 720 and processor 702 via a high-speed I/O bus. The I/O peripherals include an audio controller 746, a firmware interface 728, a wireless transceiver 726 (e.g., Wi-Fi, Bluetooth), a data storage device 724 (e.g., hard disk drive, flash memory, etc.), and a legacy I/O controller for coupling legacy (e.g., Personal System 2 (PS/2)) devices to the system. One or more Universal Serial Bus (USB) controllers 742 connect input devices, such as keyboard and mouse 744 combinations. A network controller 734 may also couple to ICH 730. In some embodiments, a high-performance network controller (not shown) couples to processor bus 710.

Figure 8:
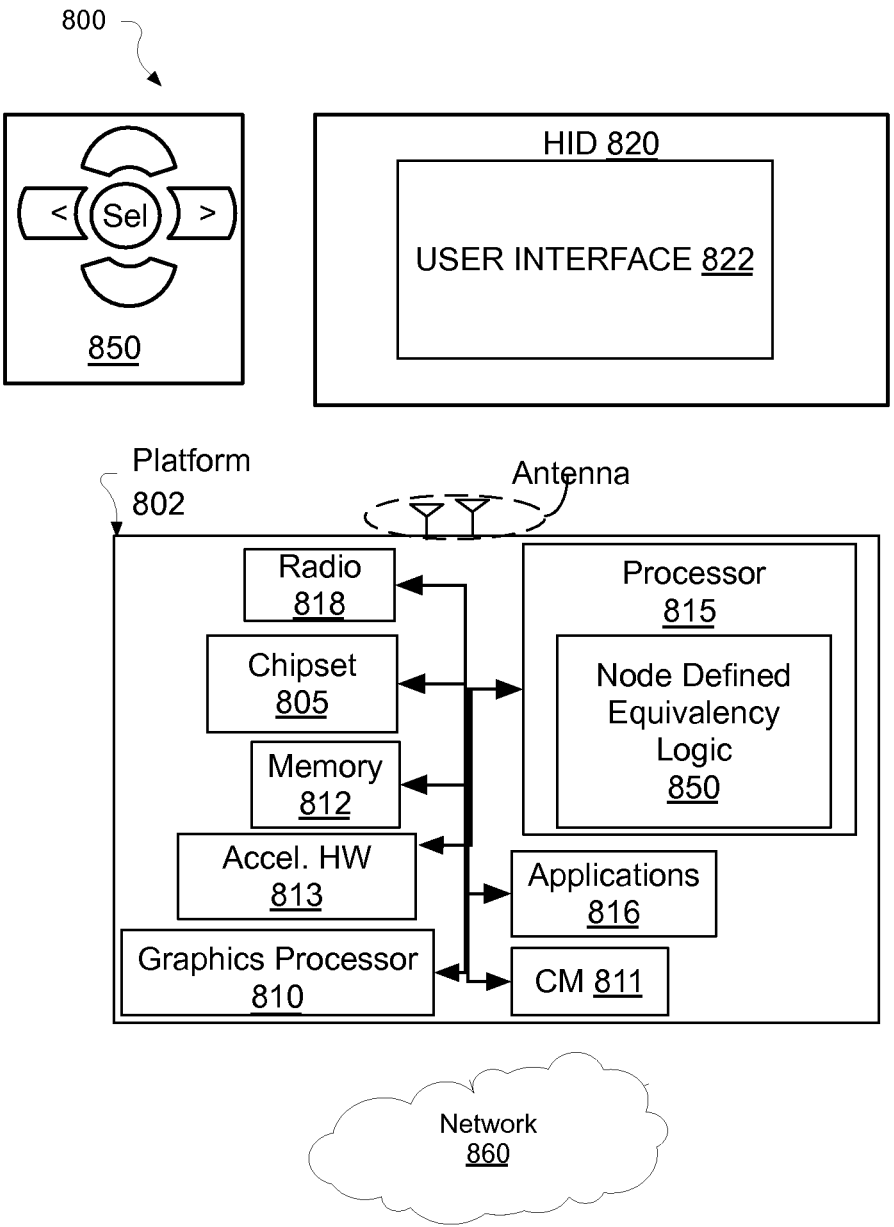
FIG. 8 is a diagram of an exemplary ultra-low power system including a processor with node defined equivalency logic, in accordance with some embodiments.

FIG. 8 is a diagram of an exemplary ultra-low power system 800 employing node-defined equivalency logic, in accordance with one or more embodiment. The node-defined equivalency logic may be in the form of a module to implement a graph-based image processing implementation optimization API including one or more equivalency class nodes, for example as described above. The node-defined equivalency logic may be in the form of a module to execute an graph-based image processing optimization including one or more equivalency class nodes, for example as described above. System 800 may be a mobile device although system 800 is not limited to this context. System 800 may be incorporated into a wearable computing device, laptop computer, tablet, touch pad, handheld computer, palmtop computer, cellular telephone, smart device (e.g., smart phone, smart tablet or mobile television), mobile internet device (MID), messaging device, data communication device, and so forth. System 800 may also be an infrastructure device. For example, system 800 may be incorporated into a large format television, set-top box, desktop computer, or other home or commercial network device.

System 800 includes a device platform 802 that may implement all or a subset of the various image graph equivalency class nodes and function mapping methods/objects described above in the context of FIG. 3A-FIG. 6. In embodiments, components of platform 802 are further implemented following the architecture of system 700 (FIG. 7). In various exemplary embodiments, central processor 815 implements node-defined equivalency class logic 750, for example including a graph executor and/or work scheduler configured to determine and account for node function equivalency, for example as described elsewhere herein. Central processor includes logic circuitry implementing an image graph executor configured to make equivalency calls node function calls to determine equivalency information, for example as described elsewhere herein. In some embodiments, one or more computer readable media may store instructions, which when executed by central processor 815 and/or graphics processor 810, cause the processor(s) to execute one or more equivalency class mapping operations.

In embodiments, device platform 802 is coupled to a human interface device (HID) 820. Platform 802 may collect raw image data with a camera module (CM) 811, which is processed and output to HID 820. A navigation controller 850 including one or more navigation features may be used to interact with, for example, device platform 802 and/or HID 820. In embodiments, HID 820 may include any monitor or display coupled to platform 802 via radio 818 and/or network 860. HID 820 may include, for example, a computer display screen, touch screen display, video monitor, television-like device, and/or a television.

In embodiments, device platform 802 may include any combination of CM 811, chipset 805, processors 810, 815, memory/storage 812, accelerator hardware 813, applications 816, and/or radio 818. Chipset 805 may provide intercommunication among processors 810, 815, memory 812, accelerator 813, applications 816, or radio 818.

One or more of processors 810, 815 may be implemented as one or more Complex Instruction Set Computer (CISC) or Reduced Instruction Set Computer (RISC) processors; x86 instruction set compatible processors, multi-core, or any other microprocessor or central processing unit (CPU).

Memory 812 may be implemented as a volatile memory device such as, but not limited to, a Random Access Memory (RAM), Dynamic Random Access Memory (DRAM), or Static RAM (SRAM). Memory 812 may also be implemented as a non-volatile storage device such as, but not limited to flash memory, battery backed-up SDRAM (synchronous DRAM), magnetic memory, phase change memory, and the like.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

The equivalency class node objects, object definitions, functions, and function calls comporting with exemplary embodiments described herein may be implemented in various hardware architectures, cell designs, or "IP cores."

Figure 9:
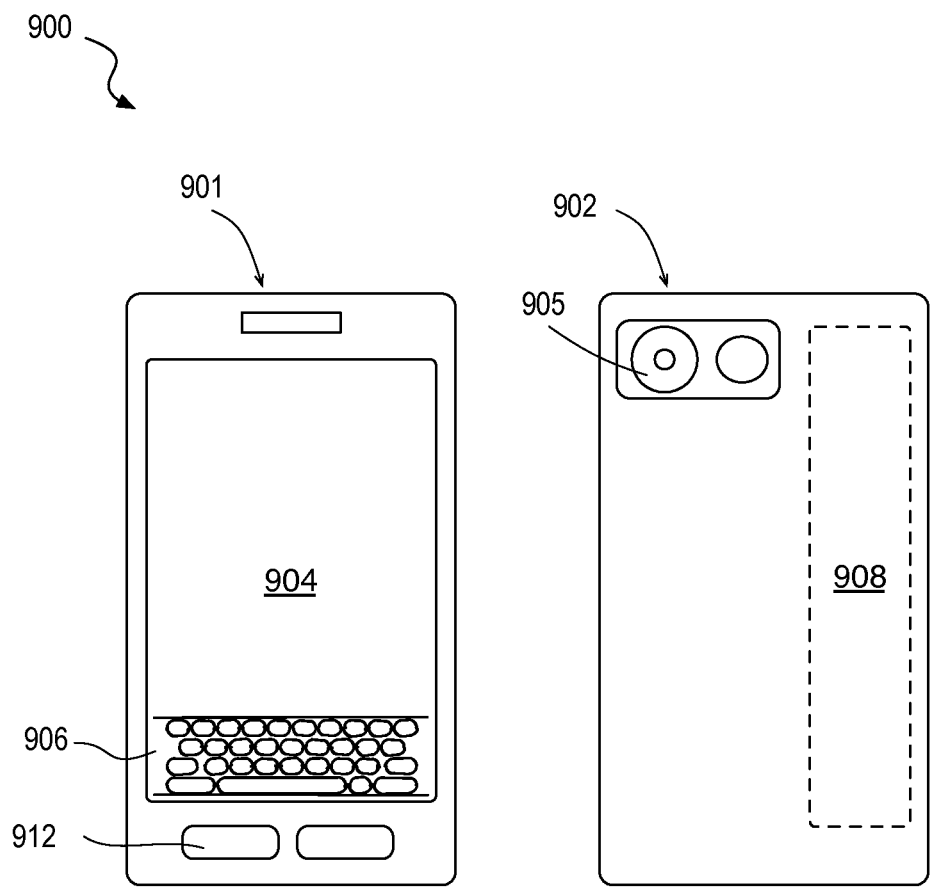
FIG. 9 is a diagram of an exemplary mobile handset platform, arranged in accordance with some embodiments.

As described above, system 800 may be embodied in varying physical styles or form factors. FIG. 9 further illustrates embodiments of a mobile handset device 900 in which platform 802, system 700, and/or implementation 600 may be embodied. In embodiments, for example, device 900 may be a mobile computing handset device having wireless and image processing capabilities. As shown in FIG. 9, mobile handset device 900 may include a housing with a front 901 and back 902. Device 900 includes a display 904, an input/output (I/O) device 906, and an integrated antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, microphones, speakers, voice recognition device and software, and so forth. Information also may be entered into device 900 by way of microphone (not shown), or may be digitized by a voice recognition device. Embodiments are not limited in this context. Integrated into at least the back 902 is camera 905 (e.g., including a lens, an aperture, and an imaging sensor), which may be components of one or more CM through which image data is exposed and output to graph optimized imaging pipeline, for example as described elsewhere herein.

As exemplified above, embodiments described herein may be implemented using hardware elements, software elements, or a combination of both. Examples of hardware elements or modules include: processors, microprocessors, circuitry, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software elements or modules include: applications, computer programs, application programs, system programs, machine programs, operating system software, middleware, firmware, routines, subroutines, functions, methods, procedures, software interfaces, application programming interfaces (API), instruction sets, computing code, computer code, code segments, computer code segments, data words, values, symbols, or any combination thereof. Determining whether an embodiment is implemented using hardware elements and/or software elements may vary in accordance with any number of factors considered for the choice of design, such as, but not limited to: desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable storage medium. Such instructions may reside, completely or at least partially, within a main memory and/or within a processor during execution thereof by the machine, the main memory and the processor portions storing the instructions then also constituting a machine-readable storage media. Programmable logic circuitry may have registers, state machines, etc. configured by the processor implementing the computer readable media. Such logic circuitry, as programmed, may then be understood as physically transformed into a system falling within the scope of the embodiments described herein. Instructions representing various logic within the processor, which when read by a machine may also cause the machine to fabricate logic adhering to the architectures described herein and/or to perform the techniques described herein. Such representations, known as cell designs, or IP cores, may be stored on a tangible, machine-readable medium and supplied to various customers or manufacturing facilities to load into the fabrication machines that actually make the logic or processor.

While certain features set forth herein have been described with reference to embodiments, this description is not intended to be construed in a limiting sense. Hence, various modifications of the implementations described herein, as well as other implementations, which are apparent to persons skilled in the art to which the present disclosure pertains are deemed to be within the spirit and scope of the present disclosure.

The following paragraphs briefly describe some exemplary embodiments.

In one or more first embodiments, an apparatus comprises an image graph executor to receive an image graph specifying a pipeline of image processing operations, to determine, for an equivalency class node in the graph, an equivalent function mapped to a function associated with the node, and to schedule an image processing subtask in which a first source data block is to be passed through the equivalency class node by calling the equivalent function.

In furtherance of at least some of the first embodiments, the image graph executor is to schedule a first image processing subtask in which a first source data block is to be passed through the equivalency class node by calling the function for execution on a first hardware resource, and is to schedule a second image processing subtask in which a second source data block is to be passed through the equivalency class node by calling the equivalent function for execution on a second hardware resource.

In furtherance of the embodiment immediately above, the first and second hardware resources comprise heterogeneous devices having different instruction set architectures.

In furtherance of at least some of the first embodiments above, the image graph executor is to schedule the second image processing subtask for execution by the second hardware resource in parallel with execution of the first image processing subtask by the first hardware resource.

In furtherance of at least some of the first embodiments, the equivalency class node specifies a priority associated with the equivalent function, and the image graph executor is to schedule the second image processing subtask based at least in part on the priority.

In furtherance of at least some of the first embodiments, the equivalent function is one of a plurality of equivalent functions defined for the equivalency class node, and the image graph executor is to make policy-based selection between the plurality of equivalent function calls based, at least in part, on one or more of: a priority associated with each of the equivalent functions; an estimated execution time for each of the equivalent functions; and a maximum time allotted to a given hardware resource slot, or to all slots.

In furtherance of at least some of the first embodiments, a first equivalency class node in the graph maps the function to a first equivalent function, and a second equivalency class node in the graph maps the function to a second equivalent function, different than the first equivalent function.

In furtherance of at least some of the first embodiments, the apparatus further comprises a graph-based implementation application programming interface (API) configured to associate a node of an image processing graph with one or more function equivalency map.

In furtherance of at least some of the embodiments immediately above, the function equivalency map is to associate two or more functions that differ in at least one of: precision, execution time, or hardware resource.

In furtherance of at least some of the embodiments above, the API includes an equivalency mapping object or function to associate a function identifier with an equivalent function identifier.

In one or more second embodiments, a computer implemented image processing method comprises receiving an image graph specifying a pipeline of image processing operations. The method further comprises determining, for a node in the graph, an equivalent function mapped to a function associated with the node. The method further comprises scheduling an image processing subtask in which a first source data block is to be passed through the equivalency class node by calling the equivalent function.

In furtherance of at least some of the second embodiments, the method further comprises scheduling a first image processing subtask in which a first source data block is to be passed through the equivalency class node by calling the function for execution on a first hardware resource, and scheduling a second image processing subtask in which a second source data block is to be passed through the equivalency class node by calling the equivalent function for execution on a second hardware resource.

In furtherance of at least some of the embodiments immediately above, the first and second hardware resources comprise heterogeneous devices having different instruction set architectures, and the method further comprises executing the first and second image processing tasks in parallel.

In furtherance of at least some of the second embodiments, the equivalency class node specifies a priority associated with the equivalent function, and the method further comprises scheduling the second image processing subtask based at least in part on the priority.

In furtherance of at least some of the second embodiments, the equivalent function is one of a plurality of equivalent functions defined for the equivalency class node, and the method further comprises making a selection between the plurality of equivalent function calls based, at least in part, on one or more of: a priority associated with each of the equivalent functions; an estimated execution time for each of the equivalent functions; and a maximum time allotted to a given hardware resource slot, or to all slots.

In furtherance of at least some of the second embodiments, the method further comprises calling a first equivalent function based on a first mapping of the function in a first equivalency class node of the graph, and calling a second equivalent function based on a second mapping of the function in a second equivalency class node of the graph.

In furtherance of at least some of the second embodiments, the method further comprises associating a node of an image processing graph with one or more function equivalency map, wherein the map associates two or more functions that differ in at least one of: precision, execution time, or hardware resource.

In one or more third embodiments, one or more computer-readable storage media includes instructions stored thereon, which when executed by a processor, cause the processor to perform any one of the second embodiments.

In furtherance of at least some of the third embodiments, the media includes instructions stored thereon, which when executed by a processor, cause the processor to perform a method further comprising determining, for a node in an image graph specifying a pipeline of image processing operations, an equivalent function mapped to a function associated with the node, and scheduling an image processing subtask in which a first source data block is to be passed through the equivalency class node by calling the equivalent function.

In furtherance of at least some of the embodiments immediately above, the media includes instructions stored thereon, which when executed by a processor, cause the processor to perform a method further comprising scheduling a first image processing subtask in which a first source data block is to be passed through the equivalency class node by calling the function for execution on a first hardware resource, and scheduling a second image processing subtask in which a second source data block is to be passed through the equivalency class node by calling the equivalent function for execution on a second hardware resource.

In one or more fourth embodiments, an apparatus comprising means to perform any one of the second embodiments.

It will be recognized that the embodiments are not limited to the exemplary embodiments so described, but can be practiced with modification and alteration without departing from the scope of the appended claims. For example, the above embodiments may include specific combination of features. However, the above embodiments are not limited in this regard and, in embodiments, the above embodiments may include undertaking only a subset of such features, undertaking a different order of such features, undertaking a different combination of such features, and/or undertaking additional features than those features explicitly listed. Scope should, therefore, be determined with reference to the appended claims, along with the full scope of equivalents to which such claims are entitled.

What is claimed is:

1. An apparatus, comprising:
one or more processors to:
receive an image graph specifying a pipeline of image processing operations;
determine, for an equivalency class node in the graph, an equivalent function mapped to a function associated with the node; and
schedule an image processing subtask in which a source image data block is to be passed through the equivalency class node by calling the equivalent function;
a hardware resource to generate a destination image data block from the source image data block by executing the equivalent function; and
an electronic memory to store the destination image data block.

2. The apparatus of claim 1, wherein the one or more processors are to:
schedule a first image processing subtask in which first source image data block is to be passed through the equivalency class node by calling the function for execution on a first hardware resource; and
schedule a second image processing subtask in which a second source image data block is to be passed through the equivalency class node by calling the equivalent function for execution on a second hardware resource.

3. The apparatus of claim 2, wherein the first and second hardware resources comprise heterogeneous devices having different instruction set architectures.

4. The apparatus of claim 3, wherein the one or more processors are to schedule the second image processing subtask for execution by the second hardware resource in parallel with execution of the first image processing subtask by the first hardware resource.

5. The apparatus of claim 2, wherein the hardware resources are to execute the image processing subtask as scheduled; and
the apparatus further comprises an electronic memory to store the source image data block and resulting destination image data block as they are consumed and produced by the hardware resources during execution of the image processing subtask.

6. The apparatus of claim 1, wherein:
the equivalency class node specifies a priority associated with the equivalent function; and
the one or more processors are to schedule the second image processing subtask based at least in part on the priority.

7. The apparatus of claim 1, wherein:
the equivalent function is one of a plurality of equivalent functions defined for the equivalency class node; and
the one or more processors are to make policy-based selection between the plurality of equivalent function calls based, at least in part, on one or more of:
a priority associated with each of the equivalent functions;
an estimated execution time for each of the equivalent functions; and
a maximum time allotted to a given hardware resource slot, or to all slots.

8. The apparatus of claim 1, wherein:
a first equivalency class node in the graph maps the function to a first equivalent function; and
a second equivalency class node in the graph maps the function to a second equivalent function, different than the first equivalent function.

9. The apparatus of claim 1,
wherein the one or more processors are to execute a graph-based implementation application programming interface (API) configured to associate a node of an image processing graph with one or more function equivalency map.

10. The apparatus of claim 9, wherein the function equivalency map is to associate two or more functions that differ in at least one of: precision, execution time, or hardware resource.

11. The apparatus of claim 9, wherein the API includes an equivalency mapping object or function to associate a function identifier with an equivalent function identifier.

12. A computer-implemented image processing method comprising:
receiving an image graph specifying a pipeline of image processing operations;
determining, for a node in the graph, an equivalent function mapped to a function associated with the node;
scheduling an image processing subtask in which a source image data block is to be passed through the equivalency class node by calling the equivalent function;
generating a destination image data block from the source image data block by executing the equivalent function on a hardware resource; and
storing the destination image data block to an electronic memory.

13. The method of claim 12, further comprising:
scheduling a first image processing subtask in which a first source image data block is to be passed through the equivalency class node by calling the function for execution on a first hardware resource; and
scheduling a second image processing subtask in which a second source image data block is to be passed through the equivalency class node by calling the equivalent function for execution on a second hardware resource.

14. The method of claim 13, wherein:
the first and second hardware resources comprise heterogeneous devices having different instruction set architectures; and
the method further comprises executing the first and second image processing tasks in parallel.

15. The method of claim 13, wherein:
the equivalency class node specifies a priority associated with the equivalent function; and the method further comprises scheduling the second image processing subtask based, at least in part, on the priority.

16. The method of claim 13, further comprising:
executing the image processing subtask as scheduled; and
storing, to an electronic memory, the source image data block and resulting destination image data block as they are consumed and produced by the hardware resources during execution of the image processing subtask.

17. The method of claim 12, wherein:
the equivalent function is one of a plurality of equivalent functions defined for the equivalency class node; and
the method further comprises making a selection between the plurality of equivalent function calls based, at least in part, on one or more of:
  a priority associated with each of the equivalent functions;
  an estimated execution time for each of the equivalent functions; and
  a maximum time allotted to a given hardware resource slot, or to all slots.

18. The method of claim 12, wherein the method further comprises:
calling a first equivalent function based on a first mapping of the function in a first equivalency class node of the graph; and
calling a second equivalent function based on a second mapping of the function in a second equivalency class node of the graph.

19. The method of claim 12, further comprising:
associating a node of an image processing graph with one or more function equivalency map, wherein the map associates two or more functions that differ in at least one of: precision, execution time, or hardware resource.

20. One or more non-transitory computer-readable storage media, with instructions stored thereon, which when executed by a processor, cause the processor to perform a method comprising:
determining, for a node in an image graph specifying a pipeline of image processing operations, an equivalent function mapped to a function associated with the node;
scheduling an image processing subtask in which a source image data block is to be passed through the equivalency class node by calling the equivalent function;
generating a destination image data block from the source image data block by executing the equivalent function on a hardware resource; and
storing to an electronic memory the destination image data block.

21. The media of claim 20, further comprising instructions stored thereon, which when executed by a processor, cause the processor to perform a method further comprising:
scheduling a first image processing subtask in which a first source image data block is to be passed through the equivalency class node by calling the function for execution on a first hardware resource; and
scheduling a second image processing subtask in which a second source image data block is to be passed through the equivalency class node by calling the equivalent function for execution on a second hardware resource.

22. The media of claim 20, further comprising instructions stored thereon, which when executed by a processor, cause the processor to perform a method further comprising:
the method further comprises making a selection between the plurality of equivalent function calls defined for the equivalency class node based, at least in part, on one or more of:
  a priority associated with each of the equivalent functions;
  an estimated execution time for each of the equivalent functions; and
  a maximum time allotted to a given hardware resource slot, or to all slots.

* * * * *